United States Patent
Rönblom

(10) Patent No.: US 11,285,588 B2
(45) Date of Patent: Mar. 29, 2022

(54) ELECTRIC PULSE TOOL

(71) Applicant: ATLAS COPCO INDUSTRIAL TECHNIQUE AB, Stockholm (SE)

(72) Inventor: Johan Rönblom, Saltsjö-Boo (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 127 days.

(21) Appl. No.: 16/770,677

(22) PCT Filed: Dec. 7, 2018

(86) PCT No.: PCT/EP2018/083980
§ 371 (c)(1),
(2) Date: Jun. 8, 2020

(87) PCT Pub. No.: WO2019/115387
PCT Pub. Date: Jun. 20, 2019

(65) Prior Publication Data
US 2021/0154810 A1    May 27, 2021

(30) Foreign Application Priority Data
Dec. 11, 2017   (SE) .................................. 1730339-7

(51) Int. Cl.
*B25B 21/02*    (2006.01)
*H02K 11/21*    (2016.01)
(Continued)

(52) U.S. Cl.
CPC .......... *B25B 21/02* (2013.01); *B25B 23/1475* (2013.01); *B25F 5/001* (2013.01);
(Continued)

(58) Field of Classification Search
CPC ...... B23P 19/066; B23P 19/065; B25B 21/02; B25B 21/00; B25B 23/1475;
(Continued)

(56) References Cited

U.S. PATENT DOCUMENTS 2,061,843 A * 11/1936 Meunier ............... B25B 21/026
173/93.6
3,741,314 A * 6/1973 Leoni ..................... B25B 21/02
173/93.6
(Continued)

FOREIGN PATENT DOCUMENTS

WO       9853960 A1    12/1998

OTHER PUBLICATIONS

International Preliminary Report on Patentability (IPRP) dated Nov. 26, 2019 issued in International Application No. PCT/EP2018/083980.
(Continued)

*Primary Examiner* — Dariush Seif
(74) *Attorney, Agent, or Firm* — Holtz, Holtz & Volek PC

(57) ABSTRACT

An electric pulse tool includes an electric motor drivingly connected to a flywheel, an output shaft drivingly connected to a drive element, and a compression spring. The electric pulse tool is operative to oscillate the flywheel between a first and a second direction. The flywheel is configured to drive the drive element in the first direction to provide a torque pulse on the output shaft in the first direction, whereby the drive element compress the compression spring. The drive element is configured to drive the flywheel in the second direction, when the compression spring is decompressed and forces the drive element to rotate in the second direction.

15 Claims, 2 Drawing Sheets

(51) Int. Cl.
  *B25B 23/147* (2006.01)
  *B25F 5/00* (2006.01)
  *H02K 7/02* (2006.01)
  *H02K 7/14* (2006.01)

(52) U.S. Cl.
  CPC .............. *H02K 7/02* (2013.01); *H02K 7/145* (2013.01); *H02K 11/21* (2016.01)

(58) Field of Classification Search
  CPC ............ B25B 23/147; B25D 2250/201; B25D 2250/221; B25F 5/001; H02K 7/02; H02K 7/145; H02K 11/21
  USPC .................................................. 173/217, 176
  See application file for complete search history.

(56) References Cited

U.S. PATENT DOCUMENTS

| | | | | |
|---|---|---|---|---|
| 4,124,026 | A * | 11/1978 | Berner | A61F 2/36 606/104 |
| 5,158,354 | A * | 10/1992 | Simonin | B25B 21/00 173/164 |
| 5,845,718 | A * | 12/1998 | Cooper | B23Q 17/24 173/176 |
| 5,848,655 | A * | 12/1998 | Cooper | B25B 21/02 173/176 |
| 6,680,595 | B2 * | 1/2004 | Ito | B25B 23/1405 173/11 |
| 6,782,956 | B1 * | 8/2004 | Seith | B25B 21/02 173/1 |
| 6,918,449 | B2 * | 7/2005 | Shinagawa | H02K 7/10 173/2 |
| 7,770,658 | B2 * | 8/2010 | Ito | B23P 19/066 173/1 |
| 9,440,340 | B2 * | 9/2016 | Hsu | B25B 27/0014 |
| 10,315,293 | B2 * | 6/2019 | Kviberg | B25B 21/02 |
| 10,882,166 | B2 * | 1/2021 | Asplund | B25B 21/02 |
| 2002/0189830 | A1 * | 12/2002 | Cripe | B25B 23/1405 173/1 |
| 2006/0185869 | A1 * | 8/2006 | Arimura | B25B 23/1475 173/176 |
| 2008/0110655 | A1 * | 5/2008 | Kettner | B25B 23/1453 173/93.5 |
| 2008/0135269 | A1 * | 6/2008 | Friberg | B25B 23/1405 173/93.5 |
| 2010/0000749 | A1 * | 1/2010 | Andel | B25B 21/026 173/48 |
| 2010/0000750 | A1 * | 1/2010 | Andel | B25B 21/02 173/48 |
| 2013/0014967 | A1 * | 1/2013 | Ito | B25F 5/021 173/93 |
| 2013/0082631 | A1 * | 4/2013 | Suzuki | H02P 6/12 318/461 |
| 2014/0069672 | A1 * | 3/2014 | Mashiko | B25B 21/00 173/47 |
| 2014/0158390 | A1 * | 6/2014 | Mashiko | B25B 21/00 173/47 |
| 2014/0166326 | A1 * | 6/2014 | Le Du | B25B 23/1475 173/181 |
| 2015/0022125 | A1 * | 1/2015 | Takano | B25F 5/008 318/139 |
| 2015/0041163 | A1 * | 2/2015 | McClung | B25B 21/02 173/1 |
| 2015/0047866 | A1 * | 2/2015 | Sakai | B25F 5/00 173/179 |
| 2015/0135907 | A1 * | 5/2015 | Hirabayashi | B25B 23/1475 81/54 |
| 2015/0231770 | A1 * | 8/2015 | Kusakawa | B25B 23/1475 173/93.5 |
| 2015/0231771 | A1 * | 8/2015 | Sakai | B25B 21/026 173/176 |
| 2015/0282337 | A1 * | 10/2015 | Ekstrom | H01H 21/12 173/170 |
| 2016/0184983 | A1 * | 6/2016 | McGougan | B25F 5/001 173/216 |
| 2016/0325415 | A1 * | 11/2016 | Huber | B25B 23/18 |
| 2017/0083014 | A1 * | 3/2017 | Conrad | B25B 21/02 |

OTHER PUBLICATIONS

International Search Report (ISR) dated Mar. 18, 2019 issued in International Application No. PCT/EP2018/083980.
Written Opinion dated Mar. 18, 2019 issued in International Application No. PCT/EP2018/083980.

* cited by examiner

ELECTRIC PULSE TOOL

TECHNICAL FIELD

The present disclosure relates to an electric pulse tool.

BACKGROUND

Electric tools for fastening bolts, screws and nuts are used in many different applications. In most of these applications it is desired or even required to be able to control the clamping force or at least an associated torque.

A problem encountered when operating electric tools, in particular handheld electric tools, is that the operator is subject to a reaction force. One way to reduce the reaction force transferred to the operator is to use a pulsed electric motor that is fed with a series of energy pulses driving the electric motor in a pulsed manner. The energy can typically be supplied as current pulses. Hereby the reaction force that the operator needs to cope with can be reduced. A disadvantage with this method is high vibrations.

Another way to reduce the reaction force is to accelerate an inertia mass and engage the inertia mass to a work piece with a clutching means. One type of clutching means is a mechanical clutch. These types of tools are often called impact wrenches. One problem with impact wrenches is that engagement and disengagement of the clutch unfortunately results in noise and wear.

Another problem with impact wrenches is that is impossible to control and measure the torque that have been delivered to the joint because of the extremely short time of the torque impact pulses.

Another type of clutching means is a hydraulic clutch. These type of tools are often called pulse tools. Although quieter in operation than existing mechanical clutches, pulse tools are also sensitive to loss of hydraulic fluids limits. Another problem with pulse tools is high energy losses in the pulse unit.

WO9853960 discloses a resonant oscillating mass-based tool including a rotatable resonant oscillating mass and a dual stiffness spring connecting the oscillating mass to a rotating friction set work piece. A problem with this tool is however that the spring design consists of four "fingers" that should bend elastically. If the fingers are not made very big and heavy it is likely that they will break after a few thousand tightenings. The requirement for this kind of tools is often 250 000 tightenings or more without failure.

Since there is a constant desire to improve the operation of electrical power tools, there exists a need for an improved electrical power tool.

SUMMARY

It is an object of the invention to provide an improved electric pulse tool which is more energy efficient, easier to manufacture and less sensitive to malfunction.

This object is achieved in accordance with a first aspect of the disclosure by an electric pulse tool comprising an electric motor drivingly connected to a flywheel. The electric pulse tool further comprises an output shaft drivingly connected to a drive element. The electric pulse tool also comprises a compression spring, whereby the electrical pulse tool is operative to oscillate the flywheel between a first and a second direction. Wherein the fly wheel is arranged to drive the drive element in the first direction to provide a torque pulse on the output shaft in the first direction, whereby the drive element compress the compression spring. Wherein the drive element is arranged to drive the fly wheel in the second direction, when the compression spring is decompressed and forces the drive element to rotate in the second direction.

One advantage with exemplary embodiments of this disclosure is that the electric pulse tool is much more energy efficient than for instance an oil pulse tool. This since the electric pulse tool among others does not contain any gaskets which cause friction in the pulse unit, and because energy is reused in the springs during the bouncing motion.

BRIEF DESCRIPTION OF THE DRAWING

The present invention will now be described in more detail by way of non-limiting examples and with reference to the accompanying drawing, in which.

DETAILED DESCRIPTION

Figure 1:
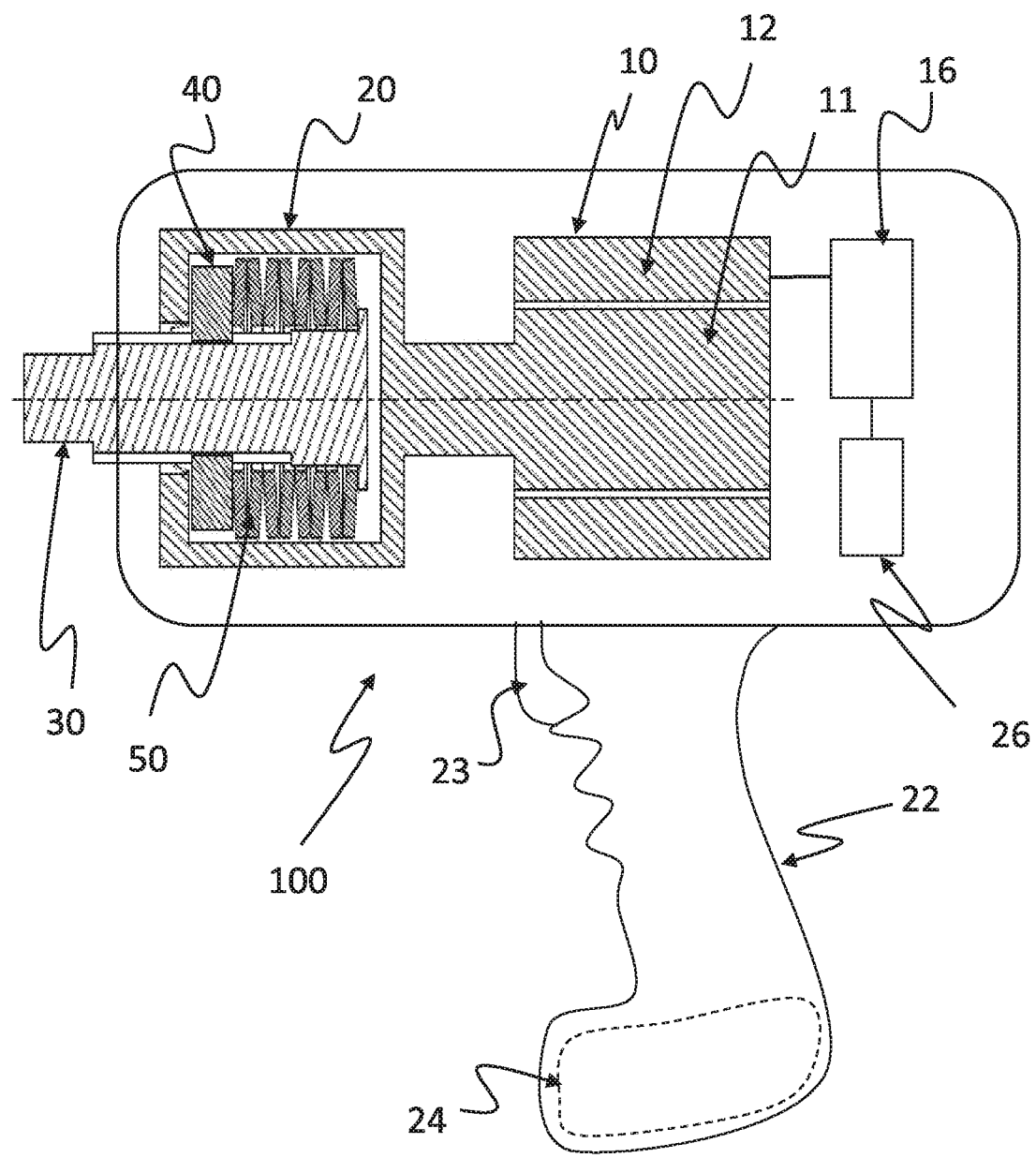
FIG. 1 shows a longitudinal section through an electric pulse tool 100 according to an exemplary embodiment.

In the following an electric pulse tool will be described. In the figures, like reference numerals designate identical or corresponding elements throughout the several figures. It will be appreciated that these figures are for illustration only and are not in any way restricting the scope of the invention. Also it is possible to combine features from different described embodiments to meet specific implementation needs.

FIG. 1 depicts an exemplary embodiment of an electric pulse tool 100 in accordance with the present disclosure. The electric pulse tool 100 is configured to perform tightening operations where torque is delivered to tighten a fastener such as screw joints or a similar action involving a rotational action performed by the electric pulse tool 100. For this purpose the electric pulse tool 100 comprises an electric motor 10 having a rotor 11 and a stator 12. The electric pulse tool 100 is operative to be able to rotate the electric motor 10 in both a first direction and a second direction.

The electric pulse tool 100 further comprises a flywheel 20 drivingly connected to the electric motor 10. Yet further the electric pulse tool 100 comprise a drive element 40, wherein the output shaft is drivingly connected to the drive element 40. The electrical pulse tool 100 further comprises a compression spring 50. The electrical pulse tool 100 is operative to oscillate the flywheel 20 between a first and a second direction. Wherein the fly wheel 20 is arranged to drive the drive element 40 in the first direction to provide a torque pulse on the output shaft 30 in the first direction, whereby the drive element 40 is arranged to compress the compression spring 50. And wherein the drive element 40 is arranged to drive the fly wheel 20 in the second direction, whereby the compression spring 50 press the drive element 40 and wherein the compression spring 50 is decompressed.

Initially, when the electric pulse tool 100 tighten a joint, the torque of the rotor 11 is enough to run down the joint in a continuous motion. When the required torque starts to build up and the required torque for continuing to tightening the joint exceeds the torque from the rotor 11, the torque delivered by the rotor 11 will no longer be able to continue tightening the joint in a continuous motion. At this stage the electrical pulse tool 100 is operative to oscillate the flywheel 20 between the first and the second direction. At this stage the fly wheel 20 drive the drive element 40 in the first direction to provide a torque pulse on the output shaft 30 in the first direction, whereby the drive element 40 compress the compression spring 50. And wherein the drive element 40 is arranged to drive the fly wheel 20 in the second direction, whereby the compression spring 50 press the drive element 40 and wherein the compression spring 50 is decompressed.

Hereby a pulsing action of the output shaft 30 providing pulses of higher torque than generated by the rotor 11 is obtained. The joint can then be further tightened by the pulsing output shaft 30 until a desired torque has been delivered to the joint.

Thus using the oscillating mass of the fly wheel 20 it is therefore possible to achieve output torques many times the electric motor 10. In this process some energy would be removed from the oscillating parts of the electric pulse tool 100. The electric motor 10 would replace this energy and add more with repeated oscillation allowing the oscillation to continue to build up. When the desired fastener torque is reached the electric motor 10 stops exciting the flywheel 20.

In a tightening operation the electric pulse tool 100 is operative to provide a higher torque in the first direction than in the second direction. According to one exemplary embodiment this is achieved by the flywheel 20 and the drive element 40 are arranged to provide a higher torsional resistance for the electric motor 10 in the first direction than in the second direction. This will have the effect that the electric pulse tool 100 is operative to provide a higher torque on the output shaft 30 the first direction than in the second direction.

According to another exemplary embodiment, the electric pulse tool 100 is arranged so that the electric motor 10 provides a higher torque in the first direction compared to the second direction. The difference in applied torque by the electric motor 10 thus prevents untightening of the joint in the second direction.

According to another exemplary embodiment, the electric pulse tool 100 is operative to accelerate the flywheel after each pulse in the second direction, in the case where the second direction is the tightening direction.

According to yet another exemplary embodiment, the electric pulse tool 100 is operative to accelerate the flywheel after each pulse in the second direction and after each pulse in the first direction. An advantage with this embodiment is that the time between pulses is shortened.

An advantage according to an exemplary embodiment of the present invention is low reaction force and low vibration. Another advantage according to an exemplary embodiment of the present disclosure is that the electric pulse tool 100 is easier to control and exhibit greater torque accuracy. The electric pulse tool 100 of the present disclosure deliver torque to the joint in smaller, more frequent torque pulses. These smaller torque pulses allow a finer control over the applied torque and is less dependent on joint stiffness. A further advantage is high energy efficiency since the energy stored in the compression spring 50 is used to drive the drive element 40 when the compression spring 50 is decompressed. In comparison with an oil pulse tool the electric pulse tool according to the present disclosure is much more energy efficient since there are less friction losses in the electric pulse tool according to the present disclosure.

Figure 2:
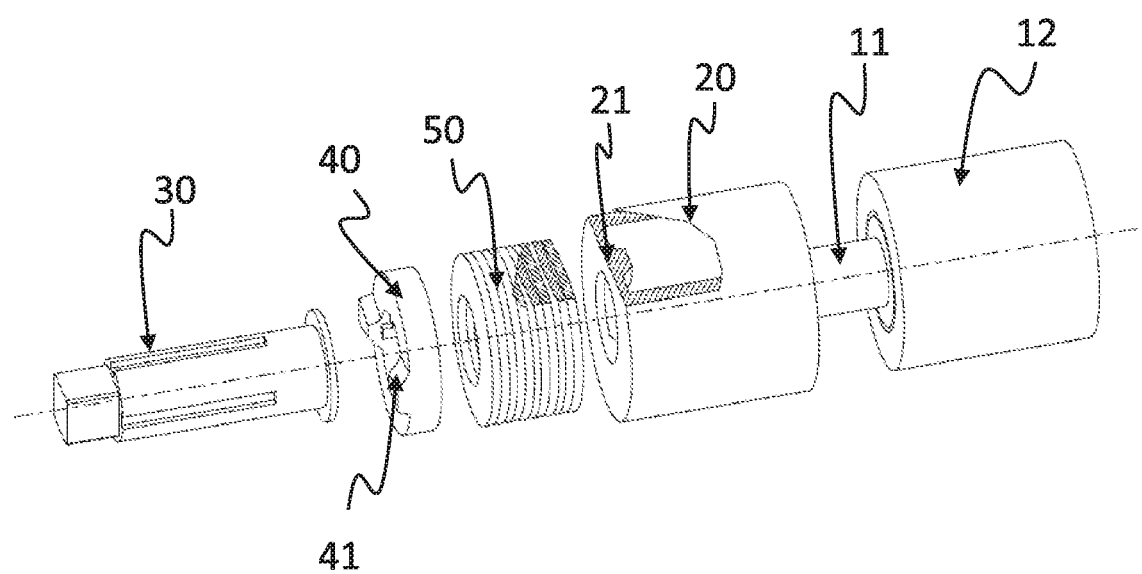
FIG. 2 depicts an exploded view of an exemplary embodiment of the electric pulse tool 100.

Now referring to FIG. 2, which discloses an exploded view of exemplary embodiments of the electric pulse tool 100. As can be seen from FIG. 2, the flywheel 20 is cylinder shaped and a second cam surface 21 is arranged or connected to the inside of one base side of the flywheel 20. In this exemplary embodiment the cylinder shaped flywheel enclose the drive element 40 and the compression spring 50.

In this exemplary embodiment the drive element 40 is axially arranged on the output shaft 30 of the electric pulse tool 100.

According to this exemplary embodiment the drive element 40 comprises or is connected to a first cam surface 41. The first cam surface 41 and the second cam surface 21 are arranged such that the fly wheel 20 drive the drive element 40 and thus the output shaft 30 in the first direction. The first cam surface 41 and the second cam surface 21 are further arranged such that the drive element 40 compress the compression spring 50. Further the first cam surface 41 and the second cam surface 21 are arranged such that the drive element 40 drive the fly wheel 20 the output shaft 30 in the second direction when the compression spring 50 is decompressed and press the drive element 40.

In another exemplary embodiment of the electric pulse tool 100, the first 41 and the second cam surfaces 21 comprise groves for balls or rollers abutting the first 41 and the second 21 cam surfaces. The groves can have a steeper inclination in the first direction than in the second direction. This is advantageous because the torque in the second direction can then be designed to be lower than in the first direction thereby not acting to loosen the joint.

In the end positions of the inclined groves the balls will press the drive element 40 and the flywheel 20 apart thereby compressing the compression spring 50.

According to one exemplary embodiment the fly wheel 20 is arranged to drive the drive element 40 and thus the output shaft 30 in the first direction when there is first relative position between the fly wheel 20 and the drive element 40. At the same time the compression spring 50 is compressed and store some energy. In this exemplary embodiment the drive element 40 is arranged to drive the fly wheel 20 and thus the output shaft 30 in the second direction when there is second relative position between the fly wheel 20 and the drive element 40.

In one exemplary embodiment the first cam surface 41 and the second cam surface 21 are arranged such that the fly wheel 20 drive the drive element 40 and thus the output shaft 30 in the first direction when there is first relative position between the fly wheel 20 and the drive element 40. At the same time the compression spring 50 is compressed and store some energy. And the drive element 40 drive the fly wheel 20 and thus the output shaft 30 in the second direction when there is second relative position between the drive element 40 and the fly wheel 20.

According to one exemplary embodiment the compression spring 50 is formed by at least one disc spring, wave spring or coil spring. According to one exemplary embodiment the electric pulse tool 100 further comprising a sensor adapted to measure a rotational speed of the rotor. In yet another exemplary embodiment the electric pulse tool 100 comprise further sensor(s) for monitoring one or more parameters relating to the operation performed by the electric tool 100. Such parameters can typically be a delivered torque pulse, etc. The sensor(s) may for example be one or more of a torque sensor, an angle sensor, an accelerometer, a gyro sensor, or the like.

The electric pulse tool 100 further comprises a handle 22, which is of a pistol type in the shown embodiment. The invention is however not limited to such a configuration but can be applied in any type of electric pulse tool 100 and not limited to the design of FIG. 1. A power supply 24 is connected to the electric motor 10. In the embodiment shown the power supply 24 is a battery that can be arranged in the lower part of the handle of the electric pulse tool 100. Other types of power supplies are also envisaged such as an external power supply supplying power via an electrical cable to the electric pulse tool 100. The electric pulse tool 100 can further comprise a trigger 23 arranged for manipulation by the operator to control the powering of the electrical motor 10.

The electric pulse tool 100 further comprise a processor 16 arranged to control the electric motor 11. The electric pulse tool 10 also comprises a memory 26 containing instructions executable by the processor 16. The processor 16 is a Central Processing Unit, CPU, microcontroller, Digital Signal Processor, DSP, or any other suitable type of processor capable of executing computer program code. The memory 26 is a Random Access Memory, RAM, a Read Only Memory, ROM, or a persistent storage, e.g. a single or combination of magnetic memory, optical memory, or solid state memory or even remotely mounted memory.

The present disclosure also relates to a computer-readable storage medium, having stored there on a computer program which, when run in the electrical pulse tool 100, causes the electrical pulse tool 10 to oscillate the flywheel 20 between the first and the second direction. The computer program which, when run in the electrical pulse tool 100, further causes the electrical pulse tool 10 to be operative according to the other exemplary described embodiments described in the present disclosure.

According to one exemplary embodiment, when the above-mentioned computer program code is run in the processor 16 of the electric pulse tool 100 it causes the electric pulse tool 10 to oscillate the flywheel 20 between the first and the second direction, and be operative according to the other exemplary described embodiments described in the present disclosure.

Thus according to one exemplary embodiment the electric pulse tool 100 comprises the processor 16 and the memory 26 containing instructions executable by the processor 16, whereby the electrical pulse tool 10 is operative to oscillate the flywheel 20 between the first and the second direction and be operative according to the other exemplary described embodiments described in the present disclosure.

In accordance with one embodiment torque measurement in the electric pulse tool 100 as described herein can be obtained by measurement of the rotational speed, in particular the maximum rotational speed, in the second direction (i.e. the direction opposite to the tightening direction) of the rotor 11. In other words the rotational speed in the second direction corresponds to a particular torque for a particular electric pulse tool 100. This is possible using the electric pulse tool 100 as described herein because the rotational speed in the second direction will provide a good measurement of the torque installed in the joint when tightening a joint as a result of the bouncing properties of the electric pulse tool 100.

The invention claimed is:

1. An electric pulse tool comprising:
an electric motor drivingly connected to a cylinder-shaped flywheel enclosing a drive element and a compression spring; and
an output shaft,
wherein the electric pulse tool is operative to oscillate the flywheel between a first and a second direction,
wherein the flywheel is configured to drive the drive element in the first direction to provide a torque pulse on the output shaft in the first direction, whereby the drive element compresses the compression spring, via first and second cam surfaces, and
wherein the drive element is configured to drive the flywheel in the second direction, when the compression spring is decompressed and forces the drive element to rotate in the second direction.

2. The electric pulse tool according to claim 1, wherein the drive element comprises the first cam surface.

3. The electric pulse tool according to claim 2, wherein the flywheel comprises or is connected to the second cam surface.

4. The electric pulse tool according to claim 3, wherein the second cam surface is arranged on an inside of one base side of the flywheel.

5. The electric pulse tool according to claim 4, wherein the first and second cam surfaces comprise groves for balls or rollers abutting the first and second cam surfaces.

6. The electric pulse tool according to claim 3, wherein the first and second cam surfaces comprise groves for balls or rollers abutting the first and second cam surfaces.

7. The electric pulse tool according to claim 1, wherein the first and second cam surfaces comprise groves for balls or rollers abutting the first and second cam surfaces.

8. The electric pulse tool according to claim 1, wherein the compression spring comprises at least one disc spring.

9. The electric pulse tool according to claim 1, wherein the torque pulse in the first direction is of higher magnitude than a torque pulse in the second direction.

10. The electric pulse tool according to claim 1, wherein the flywheel and the drive element are configured to provide a higher torsional resistance for the electric motor in the first direction than in the second direction.

11. The electric pulse tool according to claim 1, wherein the electric pulse tool is further operative to accelerate the flywheel in the first direction after each pulse in the second direction.

12. The electric pulse tool according to claim 11, wherein the electric pulse tool is further operative to accelerate the flywheel in the second direction after each pulse in the first direction.

13. The electric pulse tool according to claim 1, wherein the drive element is axially arranged on the output shaft of the electric pulse tool.

14. The electric pulse tool according to claim 1, further comprising a sensor configured to measure a rotational speed of a rotor of the electric motor.

15. The electric pulse tool according to claim 1, wherein the flywheel is configured to drive the drive element in the first direction when there is a first relative position between the flywheel and the drive element, and the drive element is configured to drive the flywheel in the second direction when there is a second relative position between the drive element and the flywheel.

* * * * *